United States Patent
Janson et al.

(10) Patent No.: US 6,725,012 B1
(45) Date of Patent: Apr. 20, 2004

(54) METHOD FOR DEPLOYING AN ORBITING SPARSE ARRAY ANTENNA

(75) Inventors: Siegfried W. Janson, Redondo Beach, CA (US); James E. Pollard, Manhattan Beach, CA (US); Chia-Chun Chao, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/495,731

(22) Filed: Feb. 1, 2000

(51) Int. Cl.[7] .......................... H04B 7/185; B64G 1/10; G06E 7/00
(52) U.S. Cl. .................. 455/12.1; 244/158 R; 244/160; 701/13; 701/26
(58) Field of Search ............... 701/13, 226; 244/158 R, 244/159, 160, 161–173; 348/352; 455/427, 428, 12.1, 13.3, 13.2; 370/316, 324

(56) References Cited

U.S. PATENT DOCUMENTS

| | | | | |
|---|---|---|---|---|
| 5,582,367 A | * | 12/1996 | Castiel et al. | 244/158 R |
| 5,641,135 A | * | 6/1997 | Stuart et al. | 244/173 |
| 5,911,389 A | * | 6/1999 | Drake | 244/158 R |
| 5,971,324 A | * | 10/1999 | Williams et al. | 244/158 R |
| 5,999,127 A | * | 12/1999 | Dezelan | 342/359 |
| 6,082,677 A | * | 7/2000 | Kikuchi | 244/158 R |
| 6,241,192 B1 | * | 6/2001 | Kondo et al. | 244/158 R |
| 6,257,526 B1 | * | 7/2001 | Taormina et al. | 244/158 R |
| 6,286,787 B1 | * | 9/2001 | Fleeter | 244/158 R |
| 6,389,336 B2 | * | 5/2002 | Cellier | 701/13 |
| 6,491,257 B1 | * | 12/2002 | Emmons et al. | 244/158 R |

\* cited by examiner

*Primary Examiner*—Charles Appiah
*Assistant Examiner*—Naghmeh Mehrpour
(74) *Attorney, Agent, or Firm*—Derrick Michael Reid

(57) ABSTRACT

A deployment method maintains a cluster of subsatellites within a rigid formation relative to and orbiting about a real or fictitious center satellite that in turn orbits the earth in a frozen inclined eccentric reference orbit by determining the subsatellite reference orbits of the each of the subsatellites based upon position and velocity vectors of the center satellite. The determined subsatellite reference orbits can then be maintained through fuel efficient microthrusting so as to maintain the rigid formation for coherently combining communication signals within a very large sparse antenna array formed by the cluster having improved beam directionality for improved signal communications.

18 Claims, 4 Drawing Sheets

METHOD FOR DEPLOYING AN ORBITING SPARSE ARRAY ANTENNA

Statement of Government Interest

The invention was made with Government support under contract No. F04701-93-C-0094 by the Department of the Air Force. The Government has certain rights in the invention.

FIELD OF THE INVENTION

The invention relates to the field of satellite clusters and sparse antenna arrays. More particularly, the present invention relates to the deployment of satellites into a cluster operating as a sparse array antenna.

BACKGROUND OF THE INVENTION

Communications satellites typically use electromagnetic waves in the radio frequency, microwave, and millimeter-wave range, from 1.0 MHz to 300 GHz, to communicate with terrestrial communication systems. The size of the antenna required is a function of the required gain or directionality and frequency used. Highly directional beams allow a single satellite to service a number of geographically dispersed users with a single frequency allocation. The highly directional beams enable significant frequency reuse to increase the overall system bandwidth. Attaining high gain or directionality in the radio frequency and low microwave frequency ranges from 10 MHz to 30 GHz can be useful for many communications and earth-sensing operations, but such high gain or directionality may require unacceptably large antenna apertures. To produce a 2.0 kilometer-diameter spot beam on the earth at a range of 1000 km at a frequency of 200 MHz, for example, requires that the satellite carry a one kilometer-diameter antenna. To get the same spot size from geosynchronous earth orbit will require an antenna with a 40.0 kilometer diameter.

The basic concept of using a cluster of satellites as a sparse aperture arrays is well known. A sparse array antenna is an array of antenna elements that are more than a wavelength apart. Sparse aperture antenna arrays can be used instead of a single large antenna. The arrays are particularly useful in applications serving geographically dispersed users because the beam directionality is typically more important than total signal gain. The resulting sparse array antenna must be large for high directionality while having many empty spaces within the resultant aperture. A large antenna is effectively emulated by coherently combining received signals from multiple small antennas. These multiple smaller antennas do not have to be physically connected. For example, a previously proposed orbital configuration consists of a single cluster ring of geostationary satellites. Gain pattern simulations of circular sparse aperture arrays show that kilometer-scale apertures composed of tens-to-thousands of individual dipole receiver elements, even with average inter-element spacing greater than ten wavelengths, can create highly directional beams useful for satellite communications.

A sparse array cluster of hundreds of satellites having a dynamic configuration extending over a kilometer in diameter is difficult to keep in formation. Orbiting cluster formations are disadvantageously disrupted due to natural perturbing forces such as solar radiation pressure, atmospheric drag, and earth gravity harmonics. Prior cluster formation disclosures have failed to teach how to provide suitable formation-keeping methods with tight tolerances for controlling the orbit of each satellite and for minimizing the total propellant expenditure for all the satellites to keep the satellites in formation. Prior cluster formation disclosures have also failed to teach how to provide viable cluster configurations for non-circular and non-geostationary orbits. These and other disadvantages are solved or reduced using the invention.

SUMMARY OF THE INVENTION

An object of the invention is to maintain an orbiting cluster of flying elements in a predetermined cluster formation as the cluster orbits the earth.

Yet another object of the invention is to maintain sparse array antenna elements in predetermined orbits and in a predetermined cluster formation with selected orbit parameters that minimize the use of propellant to maintain the cluster in formation and in the predetermined orbits.

A further object of the invention is to compute subsatellite subreference orbits from respective position and velocity vectors of the subsatellites, which vectors are computed from position and velocity vectors of a center satellite within the cluster.

Still another object of the invention is to compute thrust vectors from the computed subsatellite subreference orbits for rigidly maintaining the subsatellites the cluster formation.

Another object of the invention is to compute subsatellite subreference orbits from respective position and velocity vectors of the subsatellites, which vectors are computed from position and velocity vectors of a center satellite within the cluster, which center satellite has an inclined eccentric frozen orbit.

The method is primarily directed to space missions where the payload function is distributed among several flying elements arranged in a cluster having a center point traveling through a reference orbit where the elements fly in a rigid formation requiring a relatively small amount of $\Delta V$ thrust to maintain the cluster in the rigid formation while traveling along the reference orbit. The arbitrary flying elements can be small microsatellites or nanosatellites configured in the cluster formation as an on-orbit sparse aperture array with an overall dimension from tens-of-meters to thousands-of-kilometers. To create a cluster of satellites, orbital parameters are chosen so that each satellite occupies a node in an arbitrary spatial pattern and so that the satellite formation undergoes a cyclic motion about the center point of the cluster. The cyclic motion is preferably rotational where the satellites revolve around the center point. The formation is rigidly maintained for the duration of the mission using microthrusting. The cyclic motion of the satellite formation enables the formation to persist for several revolutions without microthrusting maneuvering. Orbital mechanics define and maintain the planar rigid formation of unconnected satellites acting as individual antenna elements within the cluster of satellites preferably comprising a mother-ship center satellite and a plurality of subsatellites in a two-dimensional suborbit plane. The subsatellites preferably suborbit around the center satellite as the center satellite orbits the earth through the reference orbit that may be a low earth orbit (LEO) as the subsatellites orbit the earth through respective subreference orbits. The method allows for the maintenance and formation-keeping of the orbiting two-dimensional sparse aperture array having the free-flying center satellite and the suborbiting subsatellites that remain spatially fixed with respect to each other within a fraction of the average inter-element spacing to eliminate the possibility of inter-satellite collisions while providing a slowly-changing antenna side lobe distribution.

The sparse array antenna has a reference orbit along which the center satellite travels and around which the other individual subsatellites suborbit. The cluster of subsatellites is disposed in a cluster suborbit plane having a normal that is inclined, for example 60°, from the normal of the reference orbit in a direction towards the instantaneous nadir. A first orbital parameter that is initially chosen is the semimajor axis. The semimajor axis of the subreference orbits for all of the subsatellites is equal to the semimajor axis of the reference orbit of the center satellite, to the first order, so that the orbital periods are identical. In a cluster reference frame, the subsatellites suborbit about the center satellite at the center of the cluster once per orbit around the earth. Each subsatellite has a respective subreference orbit plane that intersects along a respective intersection line with the reference orbit. The intersection line intersects the reference orbit at two intersection points, that is, the $(1/2)\pi$ and $(3/2)\pi$ intersection points of the reference orbit thereby defining $\pi$ and $2\pi$ alignment points of the reference orbit. The other five orbital parameters necessary for determining the subreference orbit of any one of the subsatellites within the cluster can be determined by realizing that at the $\pi$ and $2\pi$ alignment points along the subreference orbit, the subsatellite velocity vector is aligned in parallel to the center satellite velocity vector, but having a different magnitude. As such, the radial position and velocity vectors of each of the subsatellites can be computed from the radial position and velocity vector of the center satellite. The other five orbital parameters, including eccentricity, inclination, right ascension of the ascending node, argument of the perigee, and mean anomaly, are uniquely determined for any particular subsatellite from the respective position and velocity vectors of the respective subsatellite. This method is applicable for reference orbits having arbitrary choices of inclination and eccentricity.

The configuration of the formation is maintained as the cluster orbits the earth. When the cluster suborbit plane is inclined relative to the reference orbit plane, for example, at a 60° suborbit plane angle, there is no radial motion of the subsatellites within the cluster suborbit plane relative to the center satellite, and the suborbits are circular so that the cluster appears to rotate as a rigid body with each subsatellite traveling in a circle around the center satellite at the same radial distance. When the suborbit plane angle is different than 60°, the radial distances between the center point and the subsatellites cycle between maximums and minimums twice per orbit around the earth, and, the suborbits are elliptical and the cluster appears as a non-rigid elliptical body, with the subsatellites changing relative radial positions with respect to the center satellite. In all cases of suborbit plane angle, the shape of the formation is maintained and all of the subsatellites return to an initial position once per revolution around the earth. An arbitrary cluster distribution of satellites in the cluster suborbit plane can be maintained, and this cluster suborbit plane will rotate about the earth such that the suborbit plane normal is always pointing towards the earth, ninety degrees minus the suborbit plane angle, for example 30° degrees in the case of a 60° suborbit plane angle, above or below the center reference orbit plane.

The orbit maintenance and formation keeping is based on the selection of a frozen reference orbit and multiple thruster microcorrections for each subsatellite per orbit. Use of a frozen reference orbit minimizes the variations in eccentricity and argument of perigee caused by higher-order gravitational harmonics created by variations in geopotential gravity fields. The microcorrections occur along in-track and cross-track directions and are computed using an auto-feedback controller based on instantaneous relative position and velocity deviations that are derived from the position and velocity of the center satellite. With this method, formation-keeping propulsion requirements are reduced using conventional on-orbit thrusters even for multi-kilometer diameter clusters in a low earth orbit (LEO). The frozen orbit selection and multiple micro-corrections per orbit enable formation keeping with minimum propellant usage without restriction as to the size of the sparse array.

Use of an inclined planar cluster of satellites as a distributed sparse array antenna with coherent signal combining can create custom beam patterns for radio frequency and microwave communications applications. The cluster orbit can have arbitrary inclination and eccentricity. The use of multiple microcorrections per orbit provides for rigid formation keeping during a mission. The method enables the creation of extremely narrow or user-defined beamwidths at VHF, UHF, and microwave frequencies without requiring kilometer size antennas on the satellite. Coherent signal combining allows for the simultaneous generation of multiple spot beams. The coherent signal combining allows for orders-of-magnitude more frequency reuse of the VHF through microwave spectrum for space communications. The method provides for a free-flying nongeosynchronous sparse aperture array with coherent signal combining that can operate at any orbit altitude. The individual antenna subsatellites may be dispersed at various radii and azimuth angles within the cluster suborbit plane to fill a given aperture with a predetermined planar density distribution. The dispersion enables higher densities near the cluster center for improved aperture efficiency and effectively enables a tapered illumination profile. The dispersion also allows for custom density distributions for generating non-circular beam footprints. These and other advantages will become more apparent from the following detailed description of the preferred embodiment.

DETAILED DESCRIPTION OF THE PREFERRED EMBODIMENT

Figure 1:
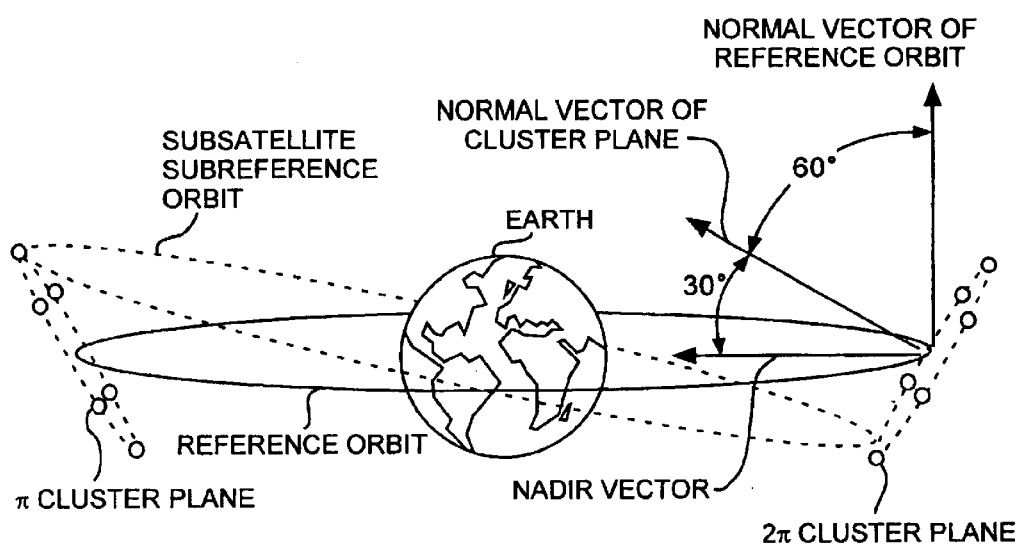
FIG. 1 is a diagram of a cluster of satellites orbiting the earth.

An embodiment of the invention is described with reference to the Figures using reference designations as shown in the Figures. Referring to all of the Figures, and particularly to FIG. 1, a cluster of satellites, including a center satellite and multiple subsatellites, orbit the earth through a reference orbit followed by the center satellite. Each subsatellite undergoes a cyclic motion within a respective suborbit in the reference frame of the center satellite that may be considered a mother ship. Each subsatellite completes one suborbit cycle around the center satellite and returns to a respective original $2\pi$ alignment position relative to the center satellite as the center satellite returns as well to a respective original $2\pi$ alignment position after one revolution about the earth. Hence, each subsatellite travels along a respective subreference orbit about the Earth and travels through a respective suborbit around the center satellite to then return to the $2\pi$ alignment position after one suborbit revolution concurrently after one revolution about the earth. All of the subsatellites in the cluster have the same value for the semimajor axis so as to have the same orbital period when perturbing forces are neglected. Each subreference orbit intersects the center satellite reference orbit plane at the $(1/2)\pi$ and $(3/2)\pi$ intersection points, and each subsatellite passes through the $\pi$ and $2\pi$ alignment points once per revolution. The cluster is populated and deployed so that each subsatellite is at the $\pi$ and also $2\pi$ positions relative to the center satellite exactly once per revolution. At the $\pi$ and $2\pi$ time instances, the subsatellite orbital velocity vector is parallel to the center satellite velocity vector, although the velocity magnitudes of the satellites are different. No further information regarding the position and velocity of the subsatellites at other points in the subreference orbits of the subsatellites is needed to determine the orbital parameters of the subsatellites.

Figure 2:
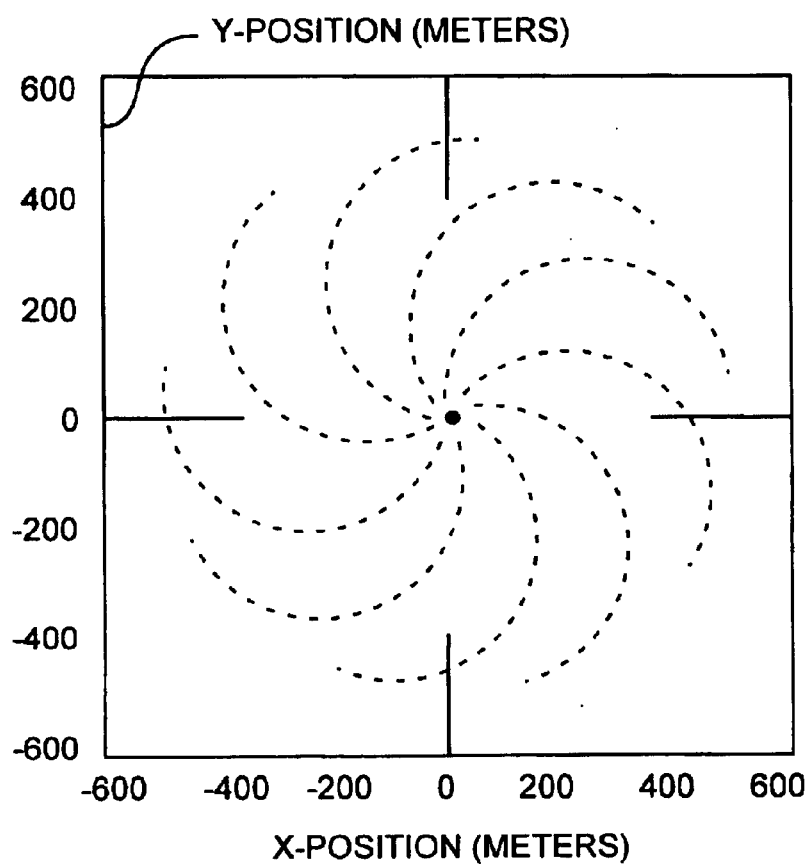
FIG. 2 is a graph of an exemplar spiral formation of a cluster of satellites.
Figure 3:
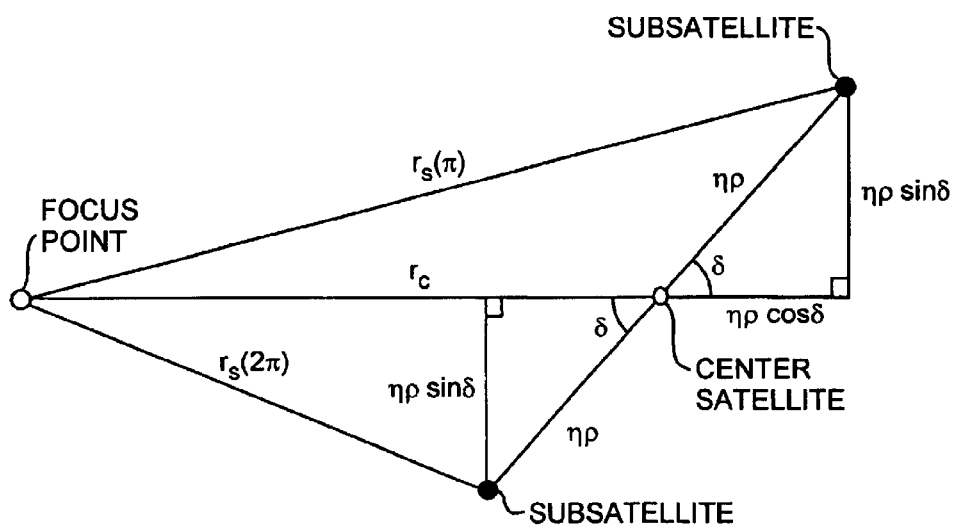
FIG. 3 is a reference diagram depicting relative geometries of subsatellites relative to a center satellite and earth.

The initial center satellite reference orbit is specified by the semimajor axis $a_c$, eccentricity $e_c$, inclination $i_c$, right ascension of the ascending node $\Omega_c$, argument of perigee $\omega_c$, and mean anomaly at epoch $M_{C0}$. Two overall cluster parameters, $\rho$ and $\delta$, and the pattern generator $\eta$ for each subsatellite are used to specify the cluster geometry. The suborbit scale factor $\rho$ determines the overall cluster size and is assigned the same distance value for all subsatellites. Note that the parameters $\rho\eta$ and a relationship between $\eta$ and angle within the suborbit plane, specify how the subsatellites are arranged within the suborbit plane. The distributions can be arbitrary or geometric, such as, concentric ellipse formations, rectangular formations, circular formations, and spiral formations such as the exemplar formation shown in FIG. 2. The suborbit plane angle $\delta$ specifies the angular orientation of the cluster plane relative to the reference orbital plane of the center satellite. The suborbit scale factor $\rho$, the cluster pattern generator $\eta$, and the suborbit plane angle $\delta$ specify the shape of the suborbit through which the subsatellite revolves around the center satellite. The formation may be configured so that the center satellite passes through a plurality of different reference points during one revolution about the focus. The focus 1 is the center of the earth as shown in FIG. 3. At these m reference points, one or more subsatellites will be at the $\pi$ and $2\pi$ positions of the respective subsatellite suborbit relative to the center satellite. The subsatellite index m runs from zero to the number of reference points. The subsatellite orbital radius $r_s$ is calculated using the center satellite radius $r_c$ and the cluster parameters $\rho$, $\eta$, and $\delta$ as shown in FIG. 3. For circular clusters, the cluster pattern generator $\eta$ is a constant value for each subsatellite. Spiral clusters, for example, have a cluster pattern generator $\eta$ that is a decreasing function of a subsatellite index m. For one possible spiral cluster, $\eta=1-0.05\ m$, and the angular coordinate is the eccentric anomaly of the center satellite at the population point, $E_c=m\times D°$, where $D°$ is the equiangular position of the subsatellites within the suborbit.

The formation keeping method uses a mathematical derivation using conventional astrodynamics definitions and equations. Determining the subsatellite orbital parameters is based upon the formation configuration and the reference orbit. An equally spaced set of $E_c$ values, such as for $D°=0°$, $30°, 60°, \ldots 360°$, may be used to populate, that is, define the cluster formation where $E_c$ is the eccentric anomaly $E_c$ of the center satellite at the location in the reference orbit when the corresponding subsatellite is at $\pi$ or $2\pi$ positions.

At these population points, the center satellite true anomaly and mean anomaly are determined from $E_c$ through standard two-body relations. These values are specified only for determining the subsatellite orbital parameters, and are not used for computing orbit propagation. From the relative geometries shown in FIG. 3, the radius and orbital speed of the subreference orbits of the subsatellites at the population points are specified by subsatellite $r_s$ radius and $v_s$ velocity equations.

Subsatellite Radius and Velocity Equations $$r_s = \sqrt{(\sqrt{\eta}\rho\sin\delta)^2 + (r_{c\pm\eta\rho\cos\delta})^2}$$

$$v_s = \sqrt{\mu\left(\frac{2}{r_s} - \frac{1}{a_s}\right)}$$

In the subsatellite $r_s$ radius and $v_s$ velocity equations, the $\pm$ sign is positive at $\pi$ subreference orbit position and negative at $2\pi$ subreference orbit position, and $\mu$ is a gravitational constant equal to $398600.5\ \text{km}^3/\text{s}^2$ for orbits about the earth. Initially, the semimajor axis $a_s$ for the subsatellites is set to the semimajor axis of the center satellite $a_c$, that is, $a_s = a_c$ for all subsatellites. In the subsatellite $r_s$ radius and $v_s$ velocity equations, the subsatellite radius $r_s$ is a function of the cluster parameters $\eta$, $\rho$ and $\delta$, and a function of the center satellite radius $r_c$, and subsatellite velocity $v_s$ is a function of the subsatellite radius $r_s$ and the semimajor axis $a_s$ that is initially set to the semimajor axis of the $a_c$ of the center satellite. Hence, initially, the radius and velocity of the subsatellite can be determined from the speed, radius and semimajor axis of the center satellite and from the cluster parameters $\delta$, $\eta$, and $\rho$. The semimajor axis $a_s$ will be modified by further computations. Using the subsatellite radius and velocity equations together with the relative geometries shown in FIG. 3, the subsatellite radius and velocity vectors in center satellite perifocal coordinates when a subsatellite is at the population point are computed using center satellite radius and velocity vectors specified by radius and velocity vectors equations, using capital letters to indicate vectors.

$$R_c = r_c \begin{bmatrix} \cos\theta_c \\ \sin\theta_c \\ 0 \end{bmatrix}$$

$$V_c = \sqrt{\frac{\mu}{p_c}} \begin{bmatrix} -\sin\theta_c \\ e_c + \cos\theta_c \\ 0 \end{bmatrix}$$

$$R_s = \begin{bmatrix} (r_c \pm \eta\rho\cos\delta)\cos\theta_c \\ (r_c \pm \eta\rho\cos\delta)\sin\theta_c \\ \pm \eta\rho\sin\delta \end{bmatrix}$$

$$V_s = \frac{v_s}{v_c} V_c$$

The $V_s$ equation indicates that the subsatellite and center satellite velocity vectors are parallel at the alignment points. Knowing the radius vector $R_s$ and velocity vector $V_s$ of a subsatellite at one point in a subreference orbit is sufficient for calculating the subreference orbital parameters, $a_s$, $e_s$, $i_s$, $\Omega_s$, $\omega_s$, and $M_{s0}$ using conventional astrodynamics equations. The subsatellite radius and velocity vectors $R_s$ and $V_s$ are transformed from center satellite perifocal coordinates to Earth-centered inertial coordinates $R_{eci}$ and $V_{eci}$ using earth centered transformation equations.

Earth Centered Transformation Equations $$R_{ecI} = R_M(i_c, \Omega_c, \omega_c) R_s$$

$$V_{ecI} = R_M(i_c, \Omega_c, \omega_c) V_s$$

In the earth centered transformation equations, $R_M(i_c, \Omega_c, \omega_c)$ is a conventional 3×3 rotational matrix. After the transformation, a set of conventional astrodynamics equations relating the Earth-centered inertial radius and velocity vectors are applied to determine the subreference orbital parameters $a_s$, $e_s$, $i_s$, $\Omega_s$, $\omega_s$, and $\theta_s$, where $\theta_s$ is the true anomaly at the population point. The corresponding eccentric anomaly and mean anomaly are determined by eccentric and mean anomaly equations.

Eccentric and Mean Anomaly Equations $$E_s = 2\arctan\left[\sqrt{\frac{1-e_s}{1+e_s}} \tan\left(\frac{\theta_s}{2}\right)\right]$$

$$M_s = E_s - e_s \sin E_s$$

The cluster is initialized with the center satellite at perigee, and hence, the initial center satellite mean anomaly is $M_{c0}=0°$. For $M_s$ at the same point, the initial subsatellite mean anomaly is $M_{s0}=M_s-M_c$, which completes the determination of the subsatellite subreference orbit parameters. The resulting $e_s$, $i_s$, $\Omega_s$, $\omega_s$, and $M_{s0}$ subreference orbital parameters are distributed around the center satellite values, with the differences depending on the magnitude of $\rho$ and on the location of the subsatellite within the cluster.

For displaying the cluster at an arbitrary value of the center satellite mean anomaly $M_c$, the eccentric anomaly $E_c$ is obtained by a numerical solution of Kepler's equation, and the corresponding true anomaly $\theta_c$ is then determined using a true anomaly equation.

True Anomaly Equation $$\theta_c = 2\arctan\left[\sqrt{\frac{1-e_c}{1+e_c}} \tan\left(\frac{E_c}{2}\right)\right]$$

The center satellite reference orbital parameters now have arbitrary values that are different from the values that were used to populate the cluster. The corresponding mean anomaly of each subsatellite is obtained from $M_s = M_{s0} + M_c$, and the subsatellite eccentric anomaly $E_s$ and true anomaly $\theta_s$ are calculated using the eccentric and true anomaly equation. Radius vectors in center satellite and subsatellite perifocal coordinates are then determined by radius perifocal coordinate vector equations.

Radius Perifocal Coordinate Vector Equations $$R_c = \frac{p_c}{1+e_c \cos\theta_c} \begin{bmatrix} \cos\theta_c \\ \sin\theta_c \\ 0 \end{bmatrix}$$

$$R_s = \frac{p_s}{1+e_s \cos\theta_s} \begin{bmatrix} \cos\theta_s \\ \sin\theta_s \\ 0 \end{bmatrix}$$

In the $R_s$ radius perifocal coordinate vector equation, $p_s = a_s(1-e_s^2)$. For conveniently visualizing the cluster, the radius vector $R_s$ is transformed to center satellite perifocal coordinates and then rotated through an angle $\theta_c$ about the Z axis so that the X axis in the viewing coordinate system is aligned with the center satellite orbit radius. These transformations are expressed by a coordinate transform equation.

Coordinate Transform Equation $$R_{vc} = Z(\theta_c)[R_M(i_c, \Omega_c, \omega_c)^T R_M(i_s, \Omega_s, \omega_s) R_s - R_c]$$

$R_{VC}$ is the radius vector of the subsatellite in the viewing coordinate system. In the coordinate transform equation, Z is a 3×3 rotational matrix. $R_M(i_c, \Omega_c, \omega_c)$ is the transpose of a conventional 3×3 rotational matrix. The origin of the viewing coordinate system is the instantaneous position of the center satellite, with the X axis along the orbit radius, the Y axis normal to the radius and in the positive velocity direction, and the Z axis normal to the orbit plane. In the coordinate transform equation, the magnitude $R_{vc}$ is the suborbit radius at a given time.

Figure 4:
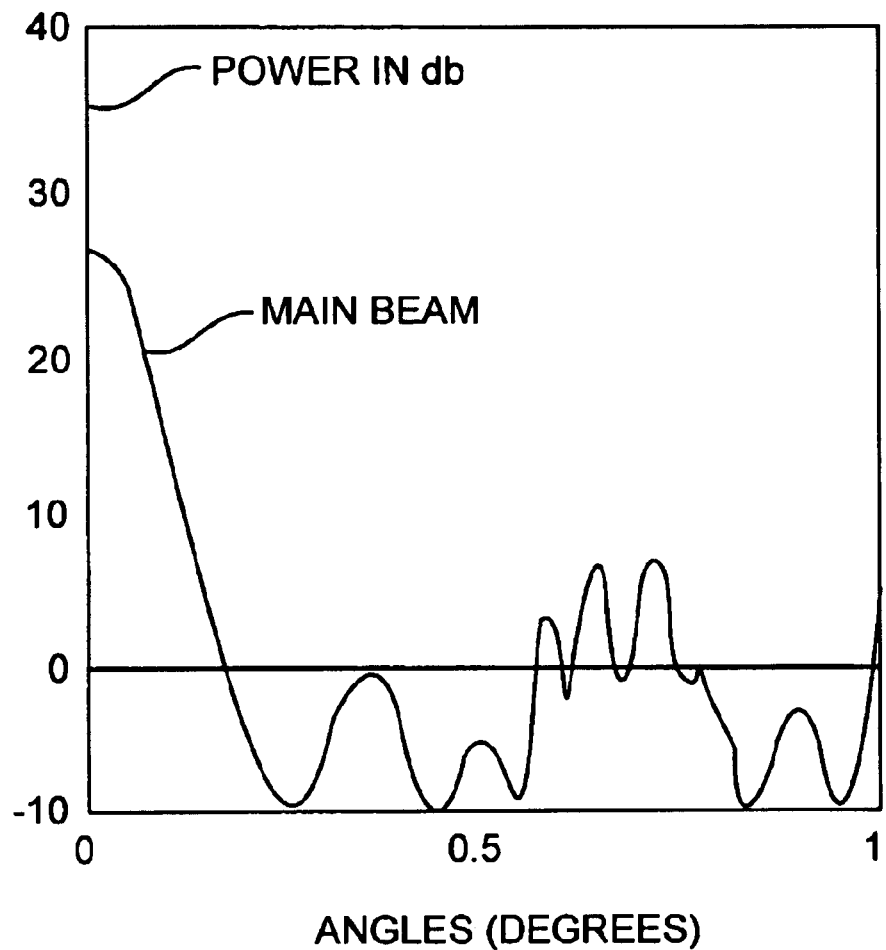
FIG. 4 is a gain profile graph of a sparse array formed by a cluster of satellites.

For an example of a 16-satellite rectangular cluster, the cluster pattern generator η uses a subsatellite index m from 0 to 15, and the center satellite eccentric anomaly at the population point is $E_c = m \times 45°$. The cluster formation is derived from the rectangular pattern generator η values of η=1 for $E_c<360°$ where m is even, η=√2 for $E_c<360°$ where m is odd, η=1/2 for $E_c>360°$ where m is even, and η=(√2)/2 for $E_c>360°$ where m is odd, and with a center satellite semimajor axis of $a_c=7085.19$ km, an eccentricity of $e_c=0.001976$, a suborbit scale factor of $\rho=800$ m, and a suborbit angle of $\delta=60°$. The rectangular pattern undergoes a clocking motion in the suborbit plane and returns to its initial configuration after one revolution around the Earth. In the viewing coordinate system the suborbits define a single plane that stays at a fixed suborbit plane angle of $\delta=60°$ relative to the center satellite orbit plane. Choosing $\delta=60°$ gives a constant value for each suborbit radius $r_{vc}$, meaning that the suborbits are circular, and the formation stays tightly locked throughout the orbit if perturbations are neglected. Any other value for δ in the range of 0° to 90° gives non-circular suborbits. If $\delta=63.435°$ is used, then the suborbits are eccentric, but when viewed along the center satellite orbit radius they appear circular. Although the suborbit radius $r_{vc}$ is oscillatory if $\delta=63.435°$, this angle creates a sparse array antenna with a constant 1:1 aspect ratio as projected onto the earth. The angle $\delta=63.435°$ is not related to the orbit inclination. As the number of subsatellites increases, the more precise is the directionality of a sparse array antenna. In the exemplar case of a one kilometer diameter phased array antenna with fifty subsatellites, a calculated gain distribution as a function of off-normal angle for 300 MHz operation is shown in FIG. 4. This sharp profile gain distribution results from coherent signal combining of received communications signals received by all of the subsatellites using a phase distribution that produces the narrowest beam width along the normal to the cluster plane.

A first-order analysis neglects important effects such as the higher-order terms in the gravitational potential, solar pressure, and atmospheric drag. The dominant effect in an earth orbit between 300 km and 2000 km is the second zonal harmonic effect $J_2$ that is due to the flattening of the earth caused by the rotation of the earth. Some of the $J_2$ effect can be corrected by adjusting individual subsatellite semimajor axes. Correction of the remaining $J_2$ effect and other on-orbit perturbations requires periodic orbit maintenance thrusting. The initial subsatellite orbital parameters can be refined to enhance cluster stability in the presence of the non-spherical geopotential. This is accomplished by calculating the subsatellite displacements relative to initial positions after one orbital period of the center satellite. Propagating the cluster for one revolution in a low earth orbit under the influence of $J_2$ reveals that the subsatellite displacements are primarily in the center satellite in-track coordinate along the Y axis with cross-track and radial displacements being at least fifty times smaller. This subsatellite displacement suggests that the semimajor axis of each subsatellite can be adjusted slightly to cancel the in-track displacement. In the unperturbed solution, the semimajor axis was the same for all satellites in the cluster, namely $a_s=a_c$. The revised subsatellite semimajor axis compensates for in-track displacements due to $J_2$ as expressed by a subsatellite semimajor axis equation.

Subsatellite semimajor Axis Equation $$a_s = a_c + \frac{\Delta Y}{3\pi}$$

In the subsatellite semimajor axis, the term $\Delta Y$ is the in-track displacement after one revolution. Typically, the revised semimajor axis differs from $a_c$ by less than three meters at 700 km altitude. The cross-track and radial displacements caused by $J_2$ are not reduced by adjusting $a_s$. A detailed assessment of cluster orbit stability may be obtained for long-term and short-term orbit histories using conventional computer propagation programs. An optimal choice of the center satellite reference orbit will enhance the cluster stability and reduce the formation-keeping $\Delta V$. The initial investigation of possible center satellite orbits considered $a_c=7078$ km that corresponds to 700 km in altitude with $i_c=60°$, $e_c=0.001$, and $\omega_c=200°$, for which the dominant perturbing forces are the $J_2$ and $J_3$ zonal harmonics and atmospheric drag. Long-term variations in $a_c$, $e_c$, $i_c$, and $\omega_c$ for this orbit can be computed by conventional propagation programs for a center satellite having for example an area-to-mass ratio of 0.04 m$^2$/kg at solar maximum conditions. A 40 m/day decay in semimajor axis is due to atmospheric drag, while large oscillations of the eccentricity are caused by $J_2$ and $J_3$ coupling effects. Secular and periodic perturbations in inclination are due to drag and Lunar-solar effects, respectively. The argument of perigee librates about 90° after passing through 360°, with a libration period that equals that of the eccentricity oscillation.

Large amplitude variations in eccentricity and argument of perigee that occur in a low earth orbit will disrupt the formation, but these variations can be greatly reduced by placing the center satellite into an eccentric near-circular frozen orbit. A frozen orbit simplifies the ephemeris representation, because there are no secular or long-period variations in $e_c$ and $\omega_c$. The long-term stability and maintenance of this type of orbit have been successfully demonstrated. A frozen orbit requires $\omega_c=90°$ and a particular value of $e_c$ that is determined by the choice of inclination and altitude. Although only one of the satellites in a cluster, such as the center satellite, can achieve frozen conditions, the total $\Delta V$ of formation keeping will be minimized when a frozen reference orbit is selected. The corresponding histories of the semimajor axis and eccentricity are constant as that of argument of perigee. In an idealized case, the frozen orbit provides long-term constancy of $a_c$, $e_c$, and $\omega_c$ in the presence of a 12×12 WGS84 gravity potential and lunar-solar attractions. Small oscillations in inclination are common to the center satellite and subsatellites, but do not significantly disrupt the formation. Solar radiation pressure and atmospheric drag will disturb the frozen orbit conditions where the eccentricity and argument of perigee are no longer constant. Uneven nodal regression of the subsatellites, due to slight differences in inclination, will further misalign the rigid formation. Therefore, periodic station-keeping maneuvers must be performed by the center satellite.

Short-term orbit propagation for the initial orbital parameters reveals the effects of atmospheric drag, solar radiation pressure, and the $J_2$ to $J_6$ gravitational harmonics on relative geometry. Calculations of in-track, cross-track and radial deviations relative to the frozen reference orbit of the center satellite due to drag and solar pressure reveal that drag is by far the larger the solar pressure at 700 km altitude. However, the largest perturbation effect is due to the $J_2$ gravitational harmonic. These deviations indicate that frequent formation-keeping maneuvers are needed to maintain the desired separations among the subsatellites.

Formation keeping is based on determining a reference orbit for each subsatellite at an arbitrary time after initialization. The center satellite trajectory is computed by propagating the mean orbital parameters under the influence of $J_2$, and then applying a set of analytical expressions for the short-term variation of the orbital parameters due to $J_2$ within a single revolution. The result is a set of time-dependent osculating orbital parameters $a_c$, $e_c$, $i_c$, $\Omega_c$, $\omega_c$, $M_c$ that are used as input parameters to calculate a time-dependent set of subsatellite subreference orbital parameters $a_s$, $e_s$, $i_s$, $\Omega_s$, $\omega_s$, and $M_{s0}$. Here, $M_{s0}$ is the subsatellite mean anomaly at a fictitious center satellite perigee corresponding to the osculating subreference orbital parameters of the center satellite. To complete the determination of the reference orbit, the subsatellite osculating mean anomaly is $M_s=M_{s0}+M_c$ where $M_c$ is the center satellite osculating mean anomaly. The maneuvering algorithm to maintain the cluster in formation is applied in three steps. In step one, a frozen orbit is selected to be the reference orbit of the center satellite. The converged mean orbital parameters may be $a_c=7085.19$ km, $e_c=0.001976$, $i_c=60°$, and $\omega_c=90°$, which are the initial center satellite reference orbital parameters. In step two, station-keeping maneuvers are performed to have the center satellite follow a frozen reference orbit. Preferably, the center satellite and the subsatellites should have the same area-to-mass ratio so that the cluster uniformly decays in altitude with time. Drag compensation is applied so that the center satellite reference orbit matches the average decay rate of all the subsatellites. The matched decay minimizes the fuel requirement for each subsatellite. In step three, formation-keeping maneuvers are performed to have the subsatellites follow respective subreference orbits computed from the center satellite reference orbit. Maneuvers will occur three times per revolution, and the $\Delta V$ of each burn is computed from an optimal auto-feedback controller based on position and velocity deviations determined, for example, from accurate sequential filtering of differential GPS measurements.

Formation keeping of two nearby spacecraft with closed-loop feedback control algorithms is known. Taking advantage of the decoupling in Clohessey-Wiltshire equations, the controllers for the in-plane and out-of-plane thrust components are designed separately. Formation keeping requires at least three equally spaced burns during each revolution to control the motion of the satellite according to conventional control laws using discrete state equations.

Discrete State In Plane Equation $$\begin{bmatrix} y_{k+1} \\ \dot{y}_{k+1} \\ \dot{x}_{k+1} \\ x_{k+1} \end{bmatrix} = A \begin{bmatrix} y_k \\ \dot{y}_k \\ \dot{x}_k \\ x_k \end{bmatrix} + B \begin{bmatrix} \Delta V_{yk} \\ \Delta V_{xk} \end{bmatrix}$$

Discrete State Out of Plane Equation $$\begin{bmatrix} z_{k+1} \\ \dot{z}_{k+1} \end{bmatrix} = C \begin{bmatrix} z_k \\ \dot{z}_k \end{bmatrix} + D\Delta V_{zk}$$

In the discrete state equations, A, B, C, and D are the transition matrices obtained from two-body solutions. Steady-state control laws are obtained by solving the discrete matrix Ricatti equation. A set of general solutions to the above discrete state equations for near-circular orbits with three burns per orbit period are used in conventional simulations.

Bi-directional thrusting with in-track and cross-track components is recommended for improved fuel efficiency with slight degradation in control accuracy. Computer simulations using the above discrete state equations have successfully demonstrated the effectiveness and robustness of the auto-feedback controller in formation keeping. The formation keeping $\Delta V$ and control accuracy are sensitive to the errors in determining the subsatellite position and velocity. Relative position and velocity of all subsatellites with respect to the center satellite are required with approximate centimeter positional and submillimeter per second velocity accuracy.

Osculating orbit parameters for the exemplar rectangular cluster are used for the formation-keeping simulations. The first subsatellite is selected because it has the largest spacing from the center satellite. The assumed orbit perturbations are earth gravity harmonics, including WGS84 and $J_2$ to $J_6$, atmospheric drag, and solar radiation pressure. The area-to-mass ratio for the center satellite is 0.04 m /kg and that for the subsatellites is 0.02 m /kg. Two levels of differential GPS relative position and velocity uncertainty are assumed to have an accuracy of 10 cm position, +1 mm/sec velocity, and 3 cm position+0.3 mm/sec velocity. The thrust magnitude uncertainty is 3%.

In-track, cross-track and radial position deviations for a ten-day formation keeping are computed using the auto-feedback controller with the two levels of differential GPS errors. The total $\Delta V$ for the subsatellite is obtained by summing the velocity increments for each maneuver as determined by the bi-directional solutions to discrete state equations. For this 700 km orbit, the estimated $\Delta V$ is 67 m/s/year with a maximum position deviation of 14 m. A 3 cm and 0.3 mm/s uncertainty has a reduced $\Delta V$ requirement of 42 m/s/year with a maximum position deviation of 7 m. The $\Delta V$ requirement is not sensitive to thrust errors less than 10%. Hence, formation keeping is feasible to maintain a cluster of subsatellites in the desired formation using the auto-feedback controller method and the high-precision differential GPS measurements. With a bi-propellant thruster of Isp=300 sec, the 42 m/s/year $\Delta V$ translates to a 0.1 kg fuel requirement for controlling a 1 kg subsatellite for 8 years. The total $\Delta V$ depends primarily on the uncertainty of the subsatellite ephemeris relative to the center satellite. Thus, the success of the formation-keeping method is dependent on a reliable and accurate onboard position determination system like differential GPS.

The formation keeping method for a LEO cluster uses a frozen orbit for the center satellite to minimize the long-term orbit deviations and the total $\Delta V$ for controlling the cluster. Center satellite station-keeping maneuvers are performed at perigee and apogee to offset atmospheric drag and solar radiation pressure as calculated by known propagation programs. When the specified reference orbit tolerance limit is reached, a two-burn Hohmann transfer is performed to recover the initial semimajor axis and eccentricity and thus preserve the frozen conditions.

A three-year simulation of center satellite station keeping may be applied to a spacecraft having an area-to-mass ratio of 0.04 m²/kg and an epoch of Jan. 1st 2001 that is near solar maximum conditions. The estimated $\Delta V$ is 38 m/sec for three years, and the semimajor axis decay rate is 40 m/day in the absence of station keeping. For a fifty meter in-track deviation tolerance, the estimated time between maneuvers is nine hours and the magnitude of each $\Delta V$ is 0.008 m/sec. With a GPS receiver and an onboard filter, the satellite position may be determined to within five meters, and the station-keeping strategy can be expected to control the center satellite with respect to the reference orbit within fifty meters. The impact of the station-keeping maneuvers of the center satellite to the formation keeping of the subsatellites can be minimized by synchronizing all the maneuvers with respect to the clock on the center satellite.

To summarize the preferred embodiment, an analysis of the orbital parameters, perturbation effects, and control determinations of a satellite cluster can be performed with each subsatellite undergoing a cyclic suborbit in the reference frame of the center satellite, where the subsatellite is at the $2\pi$ alignment point relative to the center satellite once per revolution. At this $2\pi$ alignment point, the subsatellite velocity vector is taken to be parallel to the center satellite velocity vector, so that the orbital parameters can be determined without any assumptions concerning the position or velocity of the subsatellite at other points in the orbit. This approach can be applied to eccentric orbits at any inclination with a wide range of cluster geometries, as specified by the scale factor $\rho$, the pattern generator $\eta$, and the suborbit plane angle $\delta$. Conventional analysis tools are used to evaluate cluster stability under the influence of natural perturbing forces. For near-circular LEO applications, the center satellite is maintained in a frozen reference orbit to minimize both the long-term deviations and the total $\Delta V$ for controlling all the subsatellites in the cluster. The estimated $\Delta V$ for a kilometer-scale rectangular cluster at 700 km altitude appears to be affordable, being 13 m/s/year for the center satellite and 42 m/s/year to 67 m/s/year for each subsatellite. However, the formation-keeping method uses an advanced technique of onboard navigation that delivers a 10 cm relative position accuracy using differential GPS. The major contributor to the formation-keeping $\Delta V$ for the subsatellites is the uncertainty of the relative position determination. The center satellite $\Delta V$ can be reduced by raising the reference orbit altitude or reducing the area-to-mass ratio.

The method enables cluster formation keeping within a tight tolerance and minimizes the expenditure of propellant to counteract the disruption of the satellite formation due to the natural perturbing forces. Space missions in which the payload functions are distributed among several satellites may benefit from the use of cluster orbits where the satellites fly in a tightly locked formation with a relatively small $\Delta V$ thrusting required to maintain the cluster. By properly selecting the initial Keplerian orbit parameters, the satellites can achieve the desired close separation and cluster orientation. The method is for deploying orbital elements such as satellites having relative geometry and dynamics under a two-body force field with secular geopotential $J_2$ influences. The disruption of the cluster formation due to all the major natural perturbations is managed by formation keeping. The method enables, for example, a modest 42 to 67 meters per second per year per satellite in $\Delta V$ microthrusting to control a one kilometer radius cluster at a low earth orbit. Those skilled in the art can make enhancements, improvements, and modifications to the invention, and these enhancements, improvements, and modifications may nonetheless fall within the spirit and scope of the following claims.

What is claimed is:

1. A method of deploying a subsatellite orbiting around the earth through a subreference orbit defining a subreference orbital plane, the subsatellite concurrently suborbiting through a suborbit around a center point traveling along a reference orbit around the earth, the method comprising the steps of, reference selecting reference orbital parameters for defining the reference orbit defining a reference orbital plane, the reference orbital plane intersecting the subreference orbital plane along an intersection line defining $(\frac{1}{2})\pi$ and $(\frac{3}{2})\pi$ intersection points and thereby defining $\pi$ and $2\pi$ alignment points along the reference orbit, the reference orbital parameters further defining a reference radius, a reference radius vector, a reference velocity and a reference velocity vector at the $\pi$ and $2\pi$ alignment points of the center point passing through the reference orbit, subreference selecting cluster parameters for defining relative geometries between the subsatellite and the center point, scalar determining a subreference radius and a subreference velocity of the subsatellite from the cluster parameters and from the reference orbital parameters at one of the $\pi$ and $2\pi$ alignment points where at a subreference velocity vector of the subsatellite is in alignment with a reference velocity vector of the center point, vector determining a subreference radius vector and a subreference velocity vector from the reference velocity vector, reference velocity, subreference velocity, subreference radius and the reference radius, subreference orbital parameter determining subreference orbital parameters from the subreference radius vector and the subreference velocity vector, and subsatellite deploying the subsatellite in the subreference orbit defined by the subreference orbital parameters.

2. The method of claim 1 wherein, the suborbit defines a suborbit plane, the cluster parameters comprise a suborbital plane angle for defining the suborbital plane relative to the reference orbital plane, and comprise a scaling factor and a cluster pattern generator for defining positions of the subsatellite relative to the center point at one of the alignment points.

3. The method of claim 2 further comprising the steps of deploying a center satellite in the reference orbit, repeating the scalar determining step, the vector determining step and subreference orbital parameters determining step a plurality of times for a respective plurality of additional subsatellites each having a respective different value of the cluster pattern generator, so that, the center satellite, the subsatellite and the plurality of additional subsatellites form a cluster of satellites, the cluster parameters serving to define a cluster formation revolving around the center satellite as the center satellite orbits the earth through the reference orbit.

4. The method of claim 3 further comprising the steps of, receiving a communication signal by each of the subsatellite, center satellite and the plurality of additional subsatellites all of which for providing a respective plurality of received signals, and coherently combining the respective plurality of received signals into a combined received communication signal.

5. The method of claim 3 further comprising the step of, transmitting a transmit signal coherently by each of the subsatellite, the center satellite and the plurality of additional subsatellites, all of which serving to transmit the transmit signal within a cluster beam.

6. The method of claim 1 wherein the subsatellite is an arbitrary flying element.

7. A method of deploying a cluster of satellites comprising a center satellite and a plurality of subsatellites in a cluster formation orbiting around the earth through a respective reference orbit and a respective plurality of subreference orbits, the reference orbit defined by reference orbital parameters defining a reference orbital plane, the plurality subreference orbits defining a respectively plurality of subreference orbital planes, each of the plurality of subsatellites concurrently suborbiting through a respective plurality of suborbits around the center satellite defining a center point traveling along the reference orbit around the earth, the method comprising the steps of, reference selecting reference orbital parameters for defining the reference orbit defining the reference orbital plane intersecting each of the plurality of subreference orbital planes along a respective plurality of intersection lines defining a respective plurality of $(\frac{1}{2})\pi$ and $(\frac{3}{2})\pi$ intersection points and thereby defining a respective plurality of $\pi$ and $2\pi$ alignment points along the reference orbit, the reference orbital parameters further defining a respective plurality of reference radii, reference radius vectors, reference velocities and reference velocity vectors at the respective plurality of $\pi$ and $2\pi$ alignment points of the center point passing through the reference orbit, subreference selecting cluster parameters for defining relative geometries between each of the plurality of subsatellites and the center satellite, the plurality of suborbits defining the respective plurality suborbit planes, the cluster parameters comprising a suborbital plane angle for defining the suborbital plane relative to the reference orbital plane, and comprise a scaling factor and a cluster pattern generator for defining positions of the plurality of subsatellites relative to the center satellite at the respective plurality of $\pi$ and $2\pi$ alignment points, scalar determining a respective plurality of subreference radii and a respective plurality of subreference velocities of each of the plurality of subsatellites from the cluster parameters and from the reference orbital parameters at a respective one of the plurality of $\pi$ and $2\pi$ alignment points whereat each of the plurality of subreference velocity vectors of the plurality of subsatellites is in alignment with a respective one of the plurality of reference velocity vectors of the center satellite, vector determining a respective plurality of subreference radius vectors and a plurality of subreference velocity vectors from the respective plurality of reference velocity vectors, plurality of reference velocities, plurality of subreference velocities, plurality of subreference radii and the plurality of reference radii, subreference orbital parameter determining a plurality of subreference orbital parameters from the plurality of subreference radius vectors and the plurality of subreference velocity vectors, and subsatellite deploying the center satellite in the reference orbit defined by the reference orbital parameters and the plurality of subsatellites in the respective plurality of subreference orbits defined by the respective plurality of subreference orbital parameters.

8. Method of claim 7 further comprising the steps of, receiving a communication signal by each of the plurality of subsatellites and center satellite all of which for providing a respective plurality of received signals, and coherently combining the respective plurality of received signals into a received communication signal, and transmitting a transmit signal coherently by each of the plurality of subsatellites and the center satellite all of which serving to transmit the transmit signal within a cluster beam.

9. The method of claim 7 wherein, the reference orbit is a frozen eccentric and inclined orbit, the reference orbital parameters and the plurality of subreference orbital parameters each include a semimajor axis, an eccentricity, an inclination, a right ascension of the ascending node, an argument of the perigee, and a mean anomaly, and the semimajor axis of each of the respective plurality of the subreference orbits and the reference orbit are equal.

10. The method of claim 7 wherein, the suborbital plane angle is 600° relative to the reference orbital plane, and each of the plurality of suborbits is circular about the center satellite.

11. The method of claim 7 wherein, the plurality of subreference velocity vectors $V_s$ respectively equal the respective plurality of reference velocity vectors $V_c$ respectively scaled by the plurality of subreference velocities $v_s$ respectively divided the plurality of reference velocities $v_c$ at the respective one of the plurality of $\pi$ and $2\pi$ alignment points, that is, $V_s = (v_s/v_c)V_c$.

12. The method of claim 7 further comprising the step of, microthrusting the center satellite and the plurality of subsatellites to maintain the center satellite and plurality of subsatellites in the cluster formation in the presence of perturbation forces comprising gravitational potentials, solar pressure, and atmospheric drag.

13. The method of claim 12 further comprising the step of, adjusting the semimajor axis of the plurality of subsatellites to minimize second zonal harmonic effects of the gravitational potential.

14. The method of claim 7 wherein, at the $\pi$ and $2\pi$ alignment points, $$r_s = \sqrt{(\eta\rho\sin\delta)^2 + (r_{c\pm\eta\rho\cos\delta})^2}$$

$r_s$ is one of the plurality of subreference radii of a respective one of the plurality of subsatellites, $r_c$ is the radius of the center satellite, $\rho$ is the scaling factor for the respective one of the plurality of subsatellites $\eta$ is the cluster pattern generator for all of the plurality of subsatellites, $\delta$ is the suborbit plane angle, and each of the plurality of subreference velocities of each the respective plurality of subsatellites is a function of the respective $r_s$ radius and is a function of a semimajor axis of the subreference orbital parameter equaling a semimajor axis of the reference orbital parameters of the center satellite.

15. The method of claim 7 wherein, at the $\pi$ and $2\pi$ alignment points, $$R_s = \begin{bmatrix} (r_c \pm \eta\rho\cos\delta)\cos\theta_c \\ (r_c \pm \eta\rho\cos\delta)\sin\theta_c \\ \pm\eta\rho\sin\delta \end{bmatrix}$$

$R_s$ is one of the subreference radii vectors for a respective one of the plurality of subsatellites, $r_c$ is the radius of the center satellite, $\rho$ is the scaling factor for a respective one of the plurality of subsatellites, $\eta$ is the cluster pattern generator for all of the plurality of subsatellites, $\delta$ is the suborbit plane angle, and $\theta_c$ is a true anomaly of the reference orbital parameters of the center satellite at a one of the respective plurality of the $\pi$ and $2\pi$ alignment points.

16. A method of deploying a phased array antenna as a cluster of satellites comprising a center satellite and a plurality of subsatellites in a cluster formation orbiting around the earth through a respective reference orbit and a respective plurality of subreference orbits, the reference orbit defined by reference orbital parameters defining a reference orbital plane, the plurality of subreference orbits defining a respectively plurality of subreference orbital planes, each of the plurality of subsatellites concurrently suborbiting through a respective plurality of suborbits around the center satellite defining a center point traveling along the reference orbit around the earth, the method comprising the steps of, reference selecting reference orbital parameters for defining the reference orbit that defines a reference orbital plane, the reference orbital plane intersecting each of the plurality of subreference orbital planes along a respective plurality of intersection lines defining a respective plurality of (½)$\pi$ and (3/2)$\pi$ intersection points and thereby defining a respective plurality of $\pi$ and $2\pi$ alignment points along the reference orbit, the reference orbital parameters further defining a respective plurality of reference radii, reference radius vectors, reference velocities and reference velocity vectors at the plurality of $\pi$ and $2\pi$ alignment points of the center point passing through the reference orbit, subreference selecting cluster parameters for defining relative geometries between each of the plurality of subsatellites and the center satellite, the plurality of suborbits defining a suborbital plane, the cluster parameters comprising a suborbital plane angle for defining positions of the suborbital plane relative to the reference orbital plane, and comprising a scaling factor and a cluster pattern generator for defining positions of the plurality of subsatellites relative to the center satellite at a respective one of the plurality of $\pi$ and $2\pi$ alignment points, scalar determining a respective plurality of subreference radii and a respective plurality of subreference velocities of each of the plurality of subsatellites from the cluster parameters and from the reference orbital parameters at one of the respective plurality of $\pi$ and $2\pi$ alignment points whereat each of the plurality of subreference velocity vectors of the plurality of subsatellites is in alignment with a respective one of the plurality of reference velocity vectors of the center satellite, vector determining a respective plurality of subreference radius vectors and a plurality of subreference velocity vectors from the respective plurality of reference velocity vectors, plurality of reference velocities, plurality of subreference velocities, plurality of subreference radii and the plurality of reference radii, subreference orbital parameter determining a plurality of subreference orbital parameters from the plurality of subreference radius vectors and the plurality of subreference velocity vectors, subsatellite deploying the center satellite in the reference orbit defined by the reference orbital parameters and the plurality of subsatellites in the respective plurality of subreference orbits defined by the respective plurality of subreference orbital parameters, receiving a communication signal by each of the plurality of subsatellites and center satellite, all of which for providing a respective plurality of received signals, coherently combining the plurality of received signals into a received communication signal, and transmitting a transmit signal coherently by each of the plurality of subsatellites and the center satellite all of which serving to transmit the transmit signal within a cluster beam.

17. The method of claim 16 further comprising the step of, microthrusting the center satellite and the plurality of subsatellites to maintain the center satellite and plurality of subsatellites in the cluster formation in the presence of perturbation forces comprising gravitational potentials, solar pressure, and atmospheric drag, and adjusting the semimajor axis of the plurality of subsatellites to minimize second zonal harmonic effects of the gravitational potential to minimize in-track displacement of the plurality of subsatellites from the respective subreference orbit.

18. The method of claim 17 wherein the reference selecting step, a semimajor axis of the reference orbital parameters is selected so that in the microthrusting step reference orbit matches the average decay rate of all the plurality of subsatellites due to the atmospheric drag to minimize fuel requirement during microthrusting.

* * * * *